United States Patent
Bainbridge et al.

(10) Patent No.: US 11,519,280 B1
(45) Date of Patent: Dec. 6, 2022

(54) CERAMIC MATRIX COMPOSITE VANE ASSEMBLY WITH COMPLIANCE FEATURES

(71) Applicant: Rolls-Royce plc, London (GB)

(72) Inventors: Robert S. Bainbridge, Derby (GB); Oliver D. A. O'Carroll, Derby (GB); Afzal Ali, Derby (GB); Rachel Woodfield, Derby (GB); Michael J. Whittle, Derby (GB)

(73) Assignee: Rolls-Royce plc

( * ) Notice: Subject to any disclaimer, the term of this patent is extended or adjusted under 35 U.S.C. 154(b) by 168 days.

(21) Appl. No.: 17/491,473

(22) Filed: Sep. 30, 2021

(51) Int. Cl.
*F01D 9/04* (2006.01)
*F01D 5/28* (2006.01)

(52) U.S. Cl.
CPC ............ *F01D 9/042* (2013.01); *F01D 5/282* (2013.01); *F01D 9/041* (2013.01); *F05D 2240/12* (2013.01); *F05D 2240/80* (2013.01); *F05D 2260/36* (2013.01); *F05D 2300/6033* (2013.01)

(58) Field of Classification Search
CPC ..... F01D 9/00; F01D 9/02; F01D 9/04; F01D 9/041; F01D 9/042; F01D 5/282; F01D 5/284; F05D 2240/12; F05D 2240/80; F05D 2260/36; F05D 2300/6033
See application file for complete search history.

(56) References Cited

U.S. PATENT DOCUMENTS

| | | | |
|---|---|---|---|
| 5,690,469 A | * | 11/1997 | Deal ............. F01D 9/042 29/889.22 |
| 6,045,310 A | | 4/2000 | Miller et al. |
| 6,514,046 B1 | | 2/2003 | Morrison et al. |
| 6,884,030 B2 | | 4/2005 | Darkins, Jr. et al. |
| 7,052,234 B2 | | 5/2006 | Wells et al. |
| 7,452,189 B2 | | 11/2008 | Shi et al. |
| 8,292,580 B2 | | 10/2012 | Schiavo et al. |
| 9,546,557 B2 | | 1/2017 | Grooms, III et al. |
| 9,915,159 B2 | | 3/2018 | Huizenga et al. |
| 10,072,516 B2 | | 9/2018 | Carr et al. |
| 10,094,239 B2 | | 10/2018 | Freeman et al. |
| 10,273,818 B2 | | 4/2019 | Vetters et al. |
| 10,309,240 B2 | | 6/2019 | Heitman et al. |
| 10,392,945 B2 | | 8/2019 | Dutta et al. |
| 10,408,090 B2 | | 9/2019 | Propheter-Hinckley |
| 2010/0021290 A1 | | 1/2010 | Schaff et al. |
| 2016/0123163 A1 | | 5/2016 | Freeman et al. |
| 2016/0153299 A1 | | 6/2016 | Tuertscher et al. |
| 2016/0177761 A1 | * | 6/2016 | Huizenga ............. F02C 7/20 415/209.3 |
| 2016/0290147 A1 | | 10/2016 | Weaver |
| 2017/0022833 A1 | * | 1/2017 | Heitman ............. F01D 9/041 |
| 2022/0136397 A1 | * | 5/2022 | Feie ............. F01D 9/04 415/115 |

* cited by examiner

*Primary Examiner* — Eldon T Brockman
*Assistant Examiner* — Elton K Wong
(74) *Attorney, Agent, or Firm* — Barnes & Thornburg LLP (57) ABSTRACT

A vane assembly includes a vane that includes an outer platform, an inner platform, and an airfoil. The outer platform defines an outer boundary of a gas path. The inner platform is spaced apart radially from the outer platform relative to an axis and defines an inner boundary of the gas path. The airfoil extends radially between and interconnects the outer platform and the inner platform.

9 Claims, 5 Drawing Sheets

CERAMIC MATRIX COMPOSITE VANE ASSEMBLY WITH COMPLIANCE FEATURES

FIELD OF THE DISCLOSURE

The present disclosure relates generally to airfoil assemblies for gas turbine engines, and more specifically to airfoil assemblies that comprise ceramic containing materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine are conducted toward airfoils included in stationary vanes and rotating blades of the turbine. The airfoils are often made from high-temperature resistant materials and/or are actively cooled by supplying relatively cool air to the vanes and blades due to the high temperatures of the combustion products. To this end, some airfoils for vanes and blades are incorporating composite materials adapted to withstand very high temperatures. Design and manufacture of vanes and blades from composite materials presents challenges because of the geometry and strength desired for the parts.

SUMMARY

The present disclosure may comprise one or more of the following features and combinations thereof.

A vane assembly for a gas turbine engine may include a support assembly, a ceramic matrix composite vane, and a locator assembly. The ceramic matrix composite vane may be adapted to interact with hot gases flowing through a gas path of the gas turbine engine during use of the vane assembly.

In some embodiments, the support assembly may include a metallic support carrier and load-transfer pads. The metallic support carrier may include a carrier wall that extends circumferentially at least partway about an axis and a mount flange that extends radially away from the wall.

In some embodiments, the mount flange may have a first portion and a second portion spaced apart from the first portion to define a vane-receiver space there between. The load-transfer pads may extend from the first portion of the mount flange.

In some embodiments, the ceramic matrix composite vane may include first and second platforms, an airfoil, and a vane mount. The first platform may define a first boundary of the gas path. The second platform may be spaced apart radially from the first platform relative to the axis to define a second boundary of the gas path. The airfoil may extend radially between and interconnect the first platform and the second platform. The vane mount may extend radially away from the first platform.

In some embodiments, the vane mount may be located in the vane-receiver space defined by the flange of the support carrier. The vane mount may be located in the vane-receiver space defined by the flange of the support carrier so that the load-transfer pads engage the vane mount of the vane, and In some embodiments, the locator assembly may be configured to establish and maintain a position of the vane relative to the metallic support carrier. The locator assembly may be configured to establish and maintain the position of the vane so that the airfoil of the vane properly directs the gases flowing through the gas path of the gas turbine engine while the metallic support carrier thermo-mechanically expands and contracts during use of the vane assembly in the gas turbine engine. The locator assembly may be configured to establish and maintain the position of the vane so that the vane mount of the vane engages the load-transfer pads of the support assembly to transmit loads acting on the airfoil of the vane to the metallic support carrier while the metallic support carrier thermo-mechanically expands and contracts during use of the vane assembly in the gas turbine engine.

In some embodiments, the metallic support carrier may include a slot that receives a portion of the locator assembly. The slot may be sized to allow the portion of the locator assembly to slide in the slot while the metallic support carrier thermally expands and contracts during use of the vane assembly in the gas turbine engine.

In some embodiments, the locator assembly may include a locator flange and a pin. The locator flange may engage the vane mount of the vane opposite the load-transfer pads to prevent the vane from rotating relative to the support assembly. The pin may extend through the locator flange and the second portion of the mount flange to couple the locator flange to the metallic support carrier. In some embodiments, the pin may be the portion of the locating assembly in the slot of the metallic support carrier.

In some embodiments, the locator flange may comprise ceramic matrix composite materials. In some embodiments, the locator flange may include a base and an arm. The arm may extend radially inward from the base and engage the vane mount of the vane.

In some embodiments, the arm of the locator flange may be fixed to the vane mount of the vane to block relative movement between the vane and the locator flange. In some embodiments, the arm of the locator flange may be shaped to define a key feature that mates with a corresponding key seat formed in the vane mount of the vane to block relative movement between the vane and the locator flange.

In some embodiments, the vane mount may have a leading edge, a trailing edge, a pressure side, and a suction side. The load-transfer pads may be located between the suction side of the vane mount and the first portion of the mount flange. The locator assembly may be located on the pressure side of the vane mount.

In some embodiments, the load-transfer pads may include a first load-transfer pad and a second load-transfer pad. The second load-transfer pad may be spaced apart from the first load-transfer pad along the suction side of the vane mount.

In some embodiments, the first and second load-transfer pads may be located on either side of a resultant aerodynamic load vector. The resultant aerodynamic load vector may be from aerodynamic force loads experienced by the vane during use of the vane assembly in the gas turbine engine.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
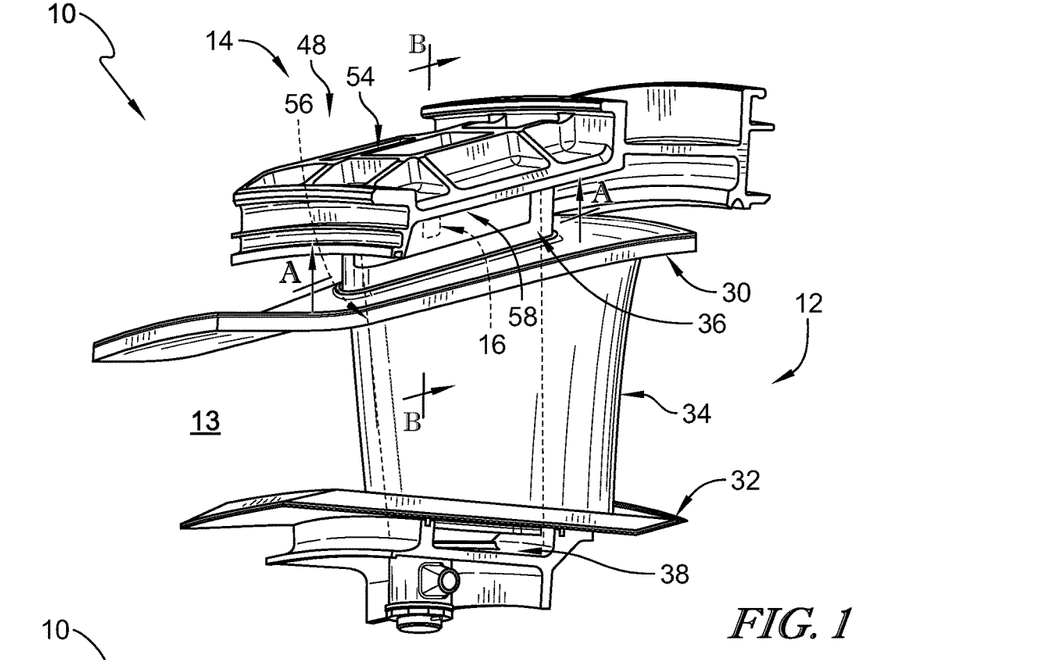
FIG. 1 is a perspective view of a vane assembly for a gas turbine engine that includes a ceramic matrix composite vane adapted to interact with hot gases flowing through a gas path of the gas turbine engine and a support assembly that has a metallic support carrier that extends radially through an interior cavity formed in the vane.
Figure 2:
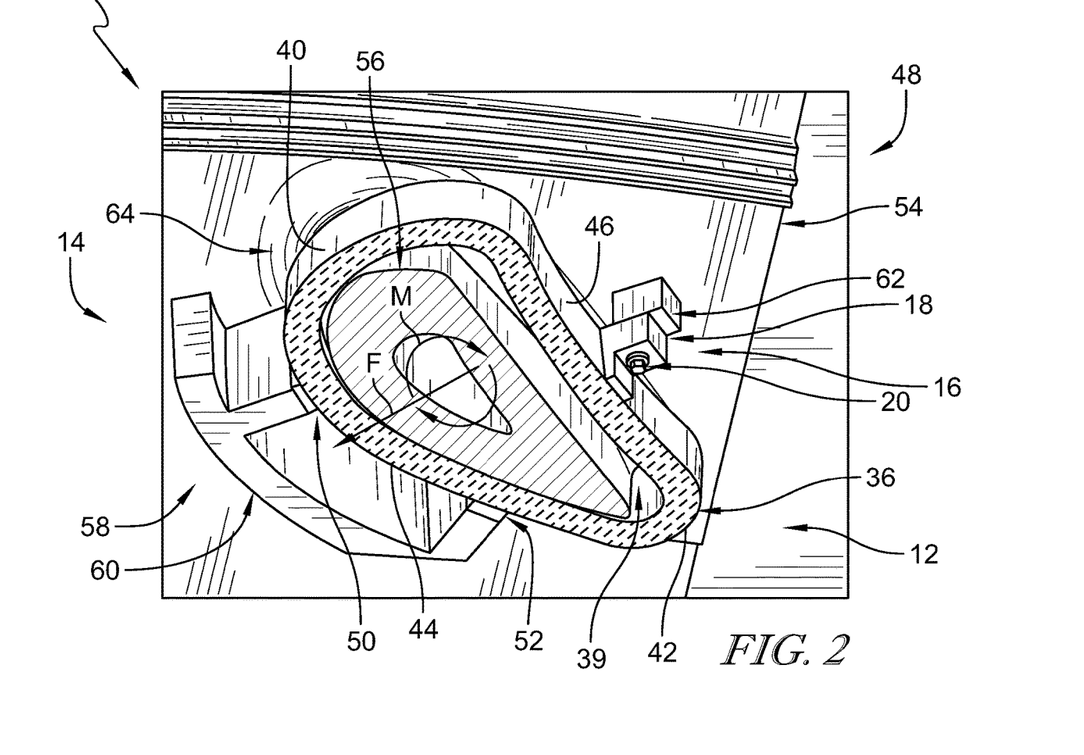
FIG. 2 is a perspective view of a sectioned portion of the vane assembly of FIG. 1 taken along line A-A showing the vane assembly further includes a locator assembly configured to establish and maintain a position of the vane relative to the metallic support carrier so that the airfoil of the vane properly directs the gases flowing through the gas path of the gas turbine engine while the metallic support carrier thermally expands and contracts during use of the vane assembly in the gas turbine engine.

A vane assembly 10 according to the present disclosure and adapted for use in a gas turbine engine is shown in FIG. 1. The vane assembly 10 includes a vane 12, a support assembly 14, and a locator assembly 16 as shown in FIGS. 1 and 2. The vane 12 is adapted to interact with hot gases flowing through a gas path 13 of the gas turbine engine during use of the vane assembly 10. The support assembly 14 extends radially through an interior cavity 39 formed in the vane 12. The locator assembly 16 is configured to establish and maintain a position of the vane 12 relative to the support assembly 14.

In this way, the positon of an airfoil of the vane 12 is maintained to properly direct the gases flowing through the gas path 13 of the gas turbine engine while the support assembly 14 thermally expands and contracts during use of the vane assembly 10 in the gas turbine engine. By maintaining the proper position of the airfoil, the locator assembly 16 also maintains engagement of the vane 12 with load-transfer pads 50, 52 included in the support assembly 14 so that aerodynamic loads acting on the vane 12 are transmitted to a support carrier 48 of the support assembly 14.

The vane 12 comprises ceramic matrix materials while the support assembly 14 includes the support carrier 48 comprising metallic materials in the illustrative embodiment. The ceramic matrix composite vane 12 is adapted to withstand high temperatures, while the metallic support carrier 48 of the support assembly 14 is adapted to support the vane 12 relative to an associated turbine case. The vane 12 is configured to shield the metallic materials of the metallic support carrier 48 that may not be capable of withstanding such high temperatures experienced by the ceramic materials of the vane 12. However, the metallic support carrier 48 may have a coefficient of thermal expansion greater than that of the ceramic matrix composite vane 12, which may cause the metallic support carrier 48 to grow away from the ceramic matrix composite vane 12 and lose contact of the load-transfer features 50, 52 with the vane 12.

To combat this difference in thermal expansion, the locator assembly 16 is configured to establish and maintain the position of the vane 12 relative to the metallic support assembly 14. The locator assembly 16 includes a locator flange 18 and a pin 20 as shown in FIG. 2. The pin 20 couples the locator flange 18 to the metallic support assembly 14 by extending through the locator flange 18 and a slot 66 formed in the metallic support carrier 48 of the support assembly 14. The slot 66 is sized to allow the metallic support carrier 48 to thermally expand and contract, while the pin 20 holds the locator flange 18 in place to maintain engagement with the vane 12.

The locator flange 18 comprises ceramic matrix composite materials in the illustrative embodiment. The locator flange 18 is also fixed to the vane 12 in the illustrative embodiment.

Figure 3:
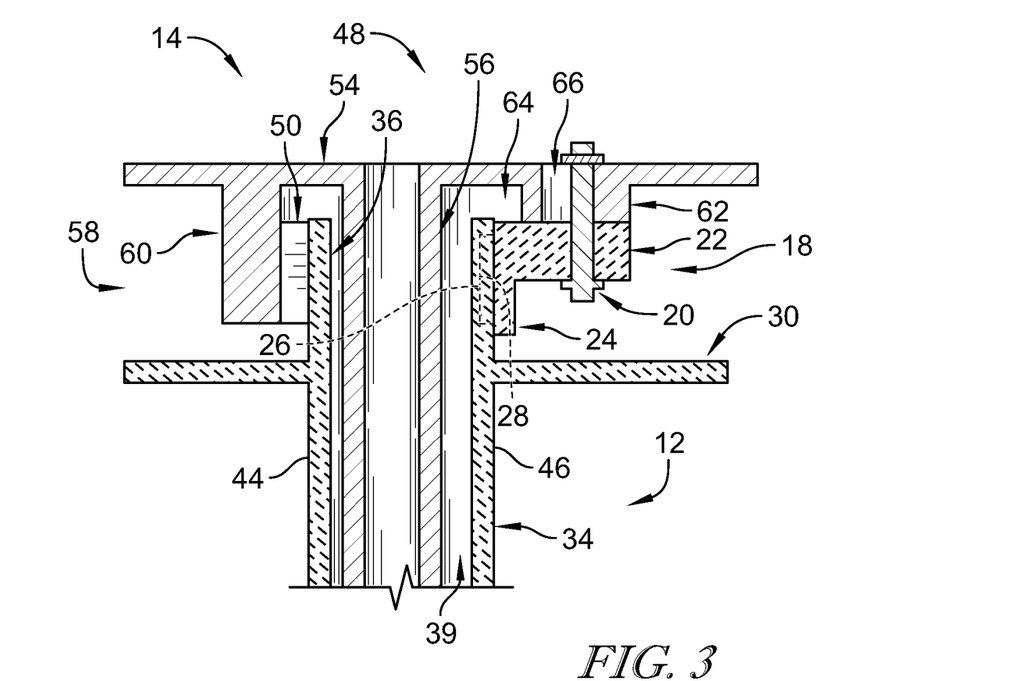
FIG. 3 is a cross-section view of the vane assembly of FIG. 1 taken along line B-B showing the turbine vane includes an outer platform that define a portion of a gas path of the gas turbine engine, an airfoil that extends radially inward from the outer platform, and an outer mount that extends radially outward from the outer platform, and further showing the locator assembly at cold build includes a locator flange engaged with the outer mount of the vane and a pin that couples the locator flange to the metallic support carrier and is free to move in a slot of the metallic support carrier.
Figure 4:
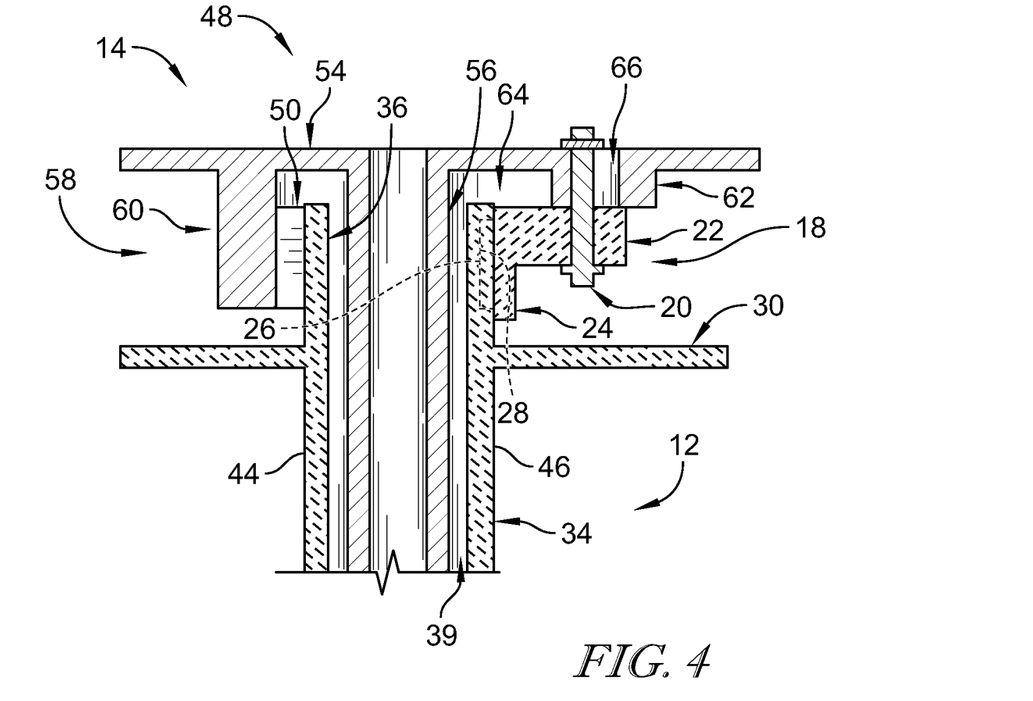
FIG. 4 is a view similar to FIG. 3 showing the metallic support carrier has thermally expanded such that the mount flange has grown away from the outer mount of the vane during use of the vane assembly in the gas turbine engine to cause the pin of the locator assembly to slide in the slot of the support carrier to maintain engagement of the locator flange with the outer mount of the vane.

The locator flange 18 includes a base 22 and an arm 24 as shown in FIGS. 3 and 4. The base 22 is coupled to the metallic support carrier 48 by the pin 20. The arm 24 extends radially inward from the base 22 and engages the vane 12 at the outer extent of the vane 12.

In the illustrative embodiment, the arm 24 of the locator flange 18 is fixed to the vane 12. The arm 24 may include a key feature 26 that mates with a key seat 28 formed in the vane 12 as suggested in FIGS. 3 and 4. In other embodiments, the locator flange 18 may be fixed using another suitable method.

The ceramic matrix composite vane 12 includes outer and inner platforms 30, 32, an airfoil 34, and outer and inner vane mounts 36, 38 as shown in FIGS. 1, 3, and 4. The outer platform 30 defines a first boundary, or outer boundary of the gas path 13. The inner platform 32 is spaced apart radially from the outer platform 30 relative to an axis 11 to define a second boundary, or inner boundary of the gas path 13. The airfoil 34 extends radially between and interconnects the outer platform 30 and the inner platform 32. The outer vane mount 36 extends radially away from the outer platform 30. The inner vane mount 38 that extends radially away from the inner platform 32.

The locator assembly 16 is described as being used with the outer vane mount 36 in the present disclosure. As shown in FIGS. 3 and 4, the locator assembly 16 engages with the outer vane mount 36 of the vane 12 to transfer loads at the outer end of the vane 12. In the illustrative embodiment, the outer vane mount 36 may have the key seat 28 for the key feature 26 of the locator flange 18 as suggested in FIGS. 3 and 4.

The vane 12 also has a leading edge 40, a trailing edge 42, a suction side 44, and a pressure side 46 as shown in FIGS. 2-4. The trailing edge 42 is spaced axially apart from the leading edge 40 of the vane 12. The suction side 44 is circumferentially spaced apart from the pressure side 46. The pressure side 46 and suction side 44 extend between and interconnect the leading edge 40 and the trailing edge 42. Both the airfoil 34 and the outer vane mount 36 have an airfoil shape with a leading edge 40, a trailing edge 42, a suction side 44, and a pressure side 46.

The support assembly 14 includes the metallic support carrier 48 and the load-transfer pads 50, 52 as shown in FIGS. 1-4. The load-transfer pads 50, 52 extend from the support carrier 48 to engage the outer vane mount 36 of the vane 12.

The metallic support carrier 48 includes a carrier wall 54, a metallic spar 56, and a flange 58 as shown in FIGS. 1-4. The carrier wall 54 extends circumferentially at least partway relative to the axis 11. The metallic spar 56 extends radially inward from the carrier wall 54 through the interior cavity 39 of the vane 12. In the illustrative embodiment, the flange 58 is integral with the carrier wall 54 and extends radially inward from the carrier wall 54.

Figure 5:
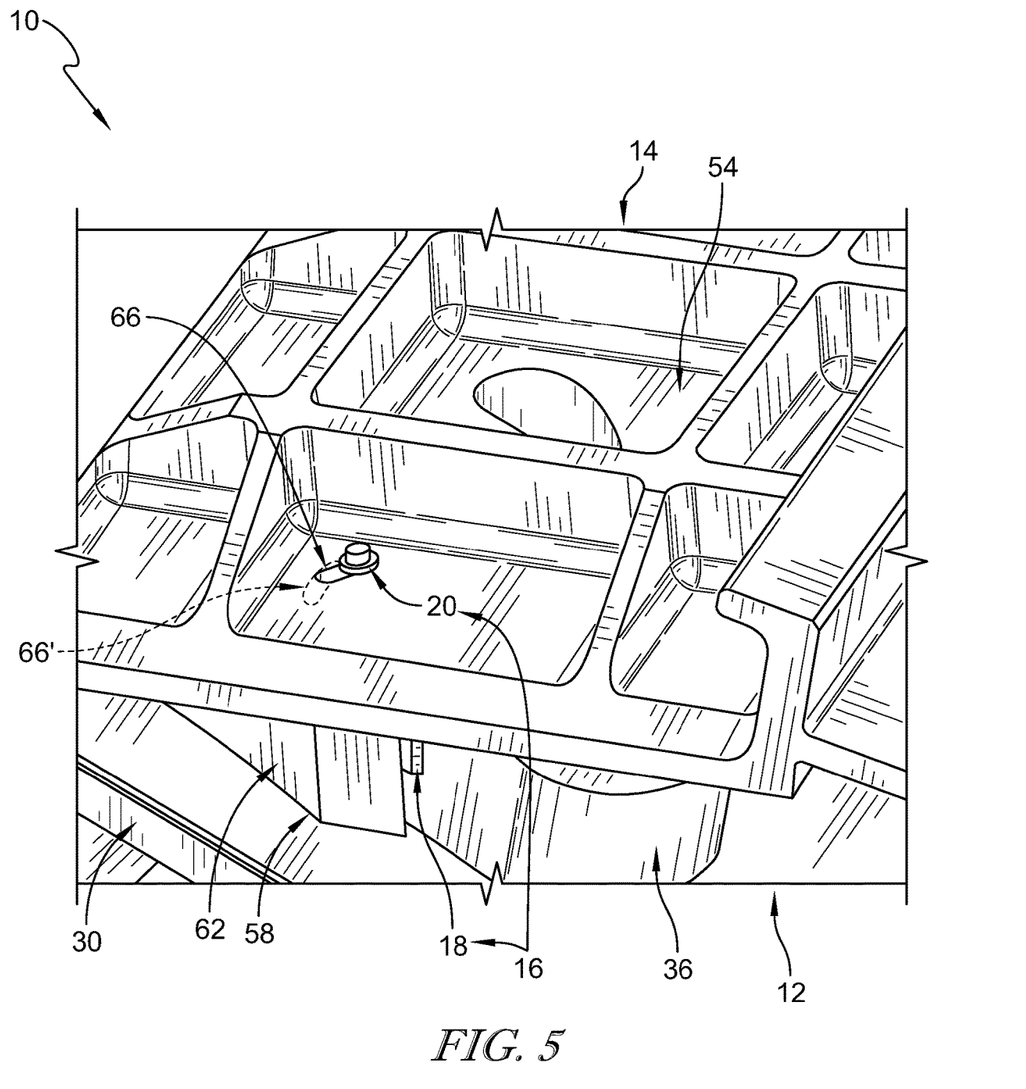
FIG. 5 is a perspective view of the vane assembly of FIG. 4 showing the pin of the locator assembly in the slot formed in a carrier wall of the metallic support carrier after the metallic support carrier has thermally expanded.

In the illustrative embodiment, the support carrier 48 is shaped to include the slot 66 as shown in FIGS. 3-5. The slot 66 extends through the carrier wall 54 and the flange 58.

The flange 58 includes a first portion 60 and a second portion 62 as shown in FIGS. 2-4. The first portion 60 extends around a portion of the suction side 44 of the outer vane mount 36. The second portion 62 extends around a portion of the pressure side 46 of the outer vane mount 36. In some embodiments, the flange 58 extend around a portion of the trailing edge 42, the suction side 44, and the pressure side 46 of the vane 12. In other embodiments, the flange 58 may be continuous so that the first and second portions 60, 62 are different portions of a single-piece, continuous looped flange 58.

In the illustrative embodiment, the second portion 62 is spaced apart from the first portion 60 to define a vane-receiver space 64 therebetween as shown in FIGS. 2-4. The outer vane mount 36 is located in the vane-receiver space 64 defined by the flange 58 of the support assembly 14. In some embodiments, the flange 58 may be split into more than two portions 60, 62.

In the illustrative embodiment, the load-transfer pads 50, 52 are located between the first portion 60 of the flange 58 included in the support assembly 14 and the outer vane mount 36 included in the vane 12 on the suction side 44 of the outer vane mount 36. The locator assembly 16 is located on the same side as the second portion 62 of the flange 58 and engages the outer vane mount 36 on the pressure side 46 of the vane 12.

In the illustrative embodiment, the locator flange 18 is pinned to the second portion 62 of the flange 58 as shown in FIGS. 3 and 4. The pin 20 extends through the locator flange 18, the second portion 62 of the flange 58, and the carrier wall 54 of the metallic support carrier 48. The slot 66 extends through the second portion 62 of the flange 58 and the carrier wall 54.

The slot 66 is shaped so as to guide the pin 20 as the metallic support carrier 48 thermally expands and contracts. At cold build, as shown in FIG. 3, the pin 20 is at one end of the slot 66. During use of the vane assembly 10, the metallic support carrier 48 thermally expands, which causes the pin 20 to move to the other end of the slot 66 as show in FIGS. 4 and 5. At cool down, the pin 20 may slide in the slot 66 back to the other end of the slot 66.

In some embodiments, the slot 66 is sized to allow for manufacturing tolerances. The pin 20 may therefore not reach the ends of the slot 66 as the metallic support carrier 48 thermally expands and contracts. Therefore, the pin 20 may be near of adjacent to one end of the slot 66 at cold build, while near or adjacent to the other end of the slit 66 during use in the gas turbine engine.

The aerodynamic load applied to the airfoil 34 of the vane 12 is transferred at the outer vane mount 36 of the vane 12 through the load-transfer pads 50, 52 on the flange 58 to the carrier wall 54. The second load-transfer pad 52 is spaced apart from the first load-transfer pad 50 along the suction side of the outer vane mount 36. In this way, the first and second load-transfer pads 50, 52 are located on either side of a resultant aerodynamic load vector F from aerodynamic force loads experienced by the vane 12 during use of the vane assembly in the gas turbine engine.

The aerodynamic moment M applied to the vane 12 is transferred through the locator assembly 16. The torsional load path is through the locator flange 18, through the pin 20, and finally through the sides of the slot 66 to the carrier wall 54.

In the illustrative embodiment, the slot 66 is straight as shown in FIG. 5. However, in other embodiments, the slot 66' may be curved as suggested in FIG. 5. The curved shape of the slot 66' may help maintain the position of the vane 12 so that the airfoil 34 properly direct the gases flowing through the gas path 13 of the gas turbine engine and maintain the engagement of the outer mount 36 of the vane 12.

A method of assembling and using the vane assembly 10 in the gas turbine engine may include several steps. The method includes arranging the support spar 56 through the interior cavity 39 to locate the outer vane mount 36 within the vane-receiver space 64. When locating the outer vane mount 36 in the vane-receiver space 64, the load-transfer pads 50, 52 are engaged with the suction side 44 of the outer vane mount 36.

Once the vane 12 is positioned on the load-transfer pads 50, 52, the locator assembly 16 is coupled to the support carrier 14. The locator flange 18 is positioned adjacent to the second portion 62 of the flange 58 and the pin 20 is inserted through the locator flange 18 and the slot 66.

After the locator assembly 16 establishes the position of the vane 12, the method includes heating the vane assembly 10 to cause the pin 20 to slide in the slot 66 and maintain engagement of the locator flange 18 with the vane 12.

Figure 6:
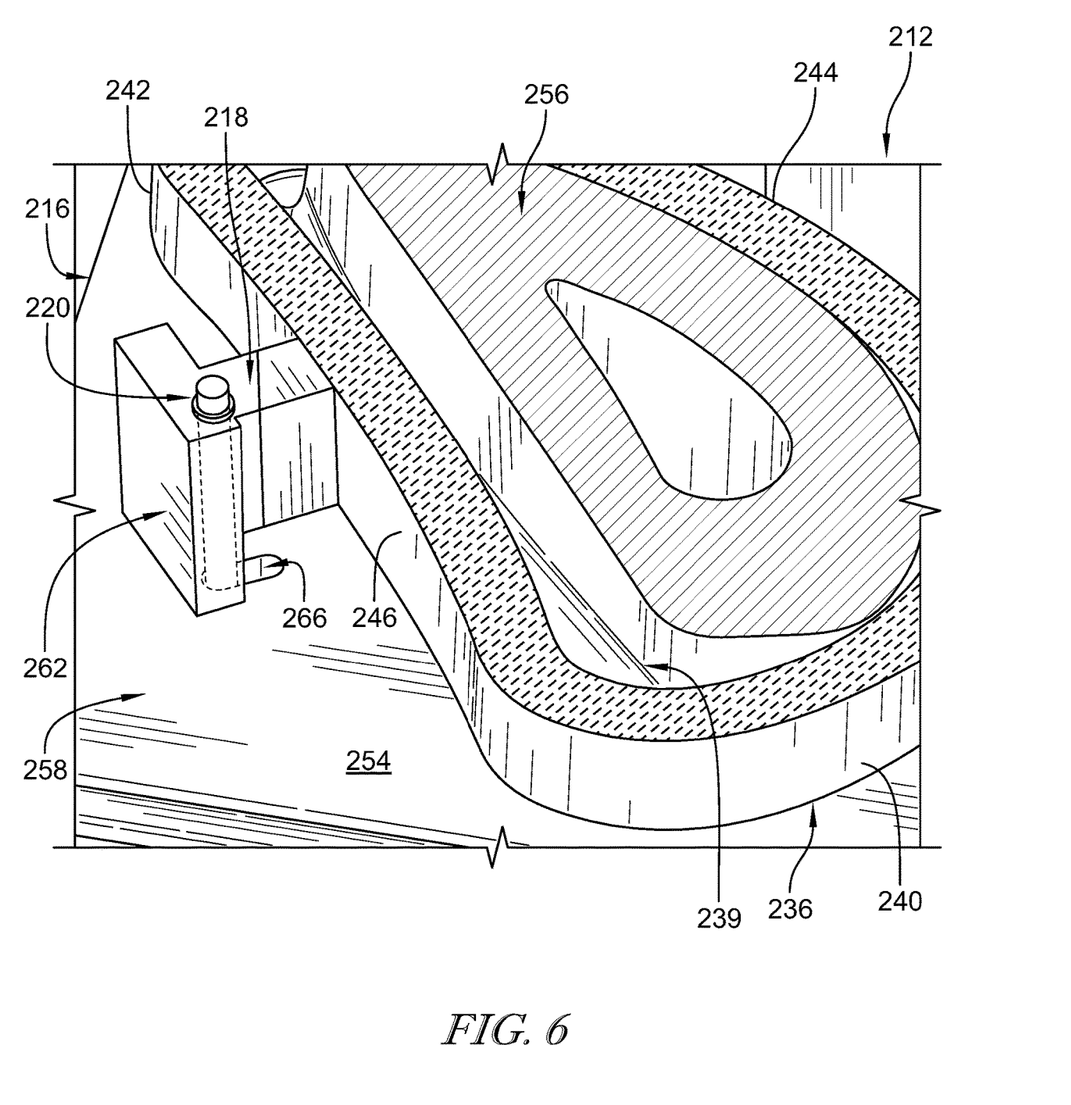
FIG. 6 is a perspective view of a sectioned portion of another embodiment of a vane assembly like that of FIG. 1 showing a mount flange included in the metallic support carrier of the support assembly is a separate component from a carrier wall of the support carrier, and further showing a pin of the locator assembly couples the mount flange to the carrier wall to block movement of the mount flange so that engagement of the locator flange with the outer mount of the vane is maintained as the metallic support carrier thermally expands and contracts.
Figure 7:
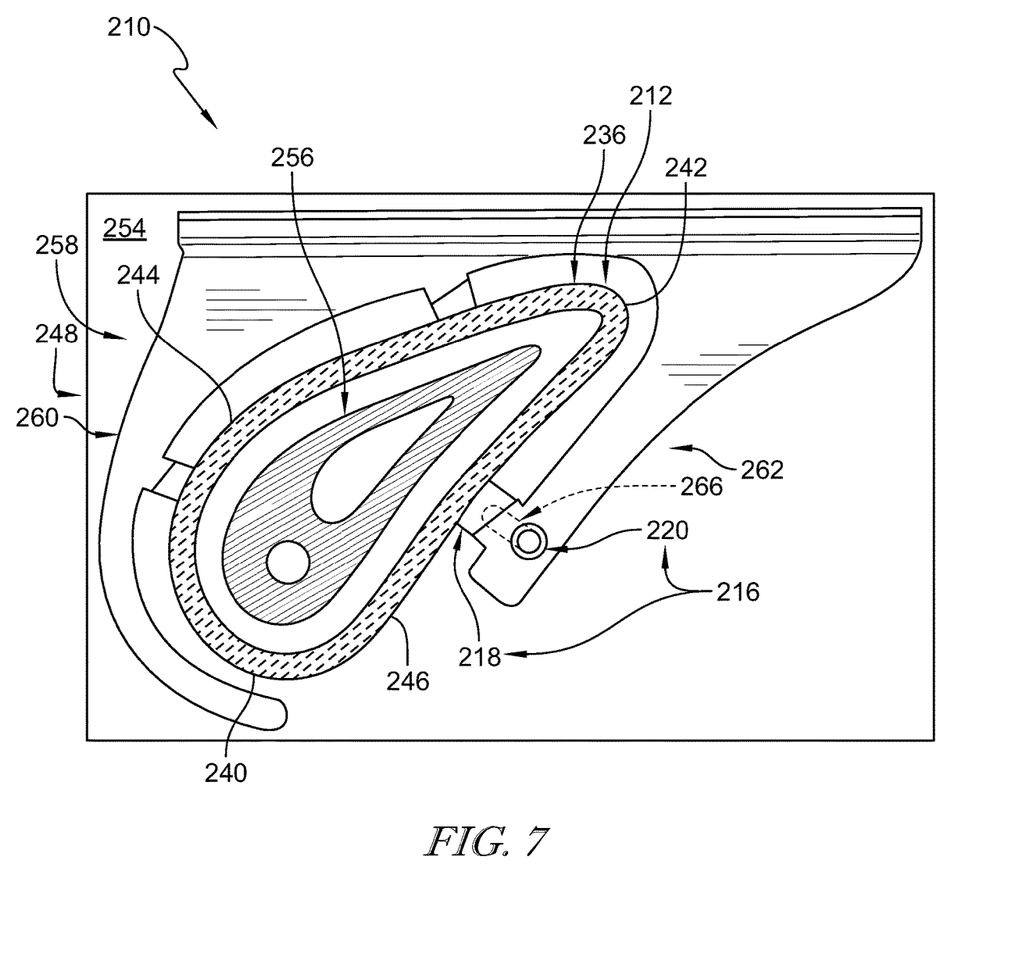
FIG. 7 is cross-section view of the vane assembly of FIG. 6 showing the mount flange extends around both the suction side and the pressure side of the outer mount of the vane, and further showing the support assembly includes load-transfer pads located between the mount flange and the outer mount of the vane on the suction side of the vane, while the locator flange of the locator assembly is located between the mount flange and the outer mount of the vane on the pressure side of the vane.

Another embodiment of a vane assembly 210 in accordance with the present disclosure is shown in FIGS. 6 and 7. The vane assembly 210 is substantially similar to the vane assembly 10 shown in FIGS. 1-5 and described herein. Accordingly, similar reference numbers in the 200 series indicate features that are common between the vane assembly 10 and the vane assembly 210. The description of the vane assembly 10 is incorporated by reference to apply to the vane assembly 210, except in instances when it conflicts with the specific description and the drawings of the vane assembly 210.

The vane assembly 210 is substantially similar to the vane assembly 10 except the flange 258 of the metallic support carrier 248 is a separate piece from the carrier wall 254. The flange 258 extends almost all the way around the leading edge 240, the trailing edge 242, the suction side 244, and the pressure side 246 of the outer mount 236 of the vane 212 as shown in FIG. 7.

The first portion 260 of the flange 258 extends around the suction side 244 of the vane 212, while the second portion 262 of the flange 258 extends around the pressure side 246 of the vane 212. The load-transfer pads 50, 52 are located between the first portion 260 of the flange 258 and the suction side 244 of the vane 212. The locator flange 218 is located between the second portion 262 of the flange 258 and the pressure side 246 of the vane 212.

Since the flange 258 is free to move relative to the carrier wall 254 and the spar 256, the pin 220 extends through the second portion 262 of the flange 258 and the carrier wall 254 to couple the second portion 262 to the carrier wall 254. The carrier wall 254 is shaped to include a slot 266 through which the pin 220 extends. The slot 266 allows the metallic support carrier 248 to thermally expand and contract, while engagement of the locator flange 218 with the vane 212 is maintained.

The load from the vane is transmitted outboard to the turbine casing. In metallic embodiments the vane structure is supported on hooks and/or rails attached to the outer platform. This design is a significant challenge for strain-limited structures manufactured from SiC/SiC CMC materials.

One solution to this challenge is to transfer the aerodynamic loading at both the inner and outer extents of the vane. The load would typically transmit through a metallic structure or spar out into the casing. However, the CMC material has a significantly lower coefficient of thermal expansion compared to the high temperature metals. As a result, there is a significant mismatch in radial height and circumference between cold build and the hottest operating conditions.

The present disclosure relates to a means of transferring the aerodynamic loading imparted on a CMC vane. The load will be transferred through two joints one at the outer annulus and the other at the inner annulus.

The locator assembly 16 described herein as being used with the outer vane mount in the present disclosure. An external set-up is used in which the load is transferred directly to the outer casing. The load is transferred from the external surface of the CMC structure. With such a design, there is a risk of losing contact when the system heats up and the metal expands circumferentially outwards, away from the CMC.

The idea is that there are a series of load pads on the suction surface that sit either side of the resultant aerodynamic load vector. The precise locations may be optimised to equally share loading at each pad. A contact on the pressure side, which prevents rotation of the airfoil and maintains stability of the structure. The location of this may be chosen such that the contact is always on the same side of the aerodynamic lift vector throughout the engine running range so that there is no unloading or reversal of loading when the pressure distribution varies.

The contact on the pressure side takes the form of a CMC flange extending from the CMC structure. The flange has a hole in it, which is then pinned to the outer casing. The outer casing has a slot, which allows this pin to move in one direction. As the system heats up, the metal will expand away from the CMC. The aerodynamic load will force the load pads on the suction surface to remain in contact. The slot allows the pin to stay in place relative to the CMC (as the metal expands the pin is held in place by the CMC flange and the pin slides in the slot). The torsional load path is through the CMC flange, through the pin and finally through the sides of the slot.

The size and thickness of the flange may be selected such that it can survive the induced stress. In some embodiments, the CMC flange may be joined to the CMC vane by a physically key feature, such as a slot or dovetail. Alternatively, the CMC flange may brazed or a machined feature. In some embodiments, more than one torsional prevention, i.e. locator flange 18, 218, may be used to minimize the stress in the flange.

The pin diameter should be sufficient to survive the shear stress. A metallic pin will have a sufficient shear strength and a low coefficient of thermal expansion. A low coefficient of thermal expansion helps ensure the fit between the pin and CMC flange is good at both cruise and max temperature conditions. A material with a low wear characteristic with CMC is preferred as there will be some relative movement.

FIG. 2 shows the underside of the outer casing. A slice has been taken through the CMC structure and metallic spar. The load-transfer pads on the suction surface are attached to features on the outer casing. The flange is shown on the pressure surface pinned to the outer casing. The arrows represent the aerodynamic force and moment on the vane.

FIG. 5 shows the pin in the slot on the outer carrier wall. This represents the system at hot operating conditions, expanded. As the metal cools and contracts the pin will slide to the other end of the slot.

In the illustrative embodiments, the load-transfer pads may have an angled contact surface with the flange of the metallic support carrier. The load-transfer pads may have an angled contact to react any twisting moment of the assembly.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A vane assembly for a gas turbine engine, the vane assembly comprising
   a support assembly including a metallic support carrier and load-transfer pads, the metallic support carrier including a carrier wall that extends circumferentially at least partway about an axis and a mount flange that extends radially away from the wall, the mount flange having a first portion and a second portion spaced apart from the first portion to define a vane-receiver space there between, and the load-transfer pads extend from the first portion of the mount flange,
   a ceramic matrix composite vane adapted to interact with hot gases flowing through a gas path of the gas turbine engine during use of the vane assembly, the ceramic matrix composite vane including a first platform that defines a first boundary of the gas path, a second platform spaced apart radially from the first platform relative to the axis to define a second boundary of the gas path, an airfoil that extends radially between and interconnects the first platform and the second platform, and a vane mount that extends radially away from the first platform and located in the vane-receiver space defined by the flange of the support carrier so that the load-transfer pads engage the vane mount of the vane, and a locator assembly configured to establish and maintain a position of the vane relative to the metallic support carrier so that (i) the airfoil of the vane properly directs the gases flowing through the gas path of the gas turbine engine and (ii) the vane mount of the vane engages the load-transfer pads of the support assembly to transmit loads acting on the airfoil of the vane to the metallic support carrier while the metallic support carrier thermo-mechanically expands and contracts during use of the vane assembly in the gas turbine engine.

2. The vane assembly of claim 1, wherein the metallic support carrier includes a slot that receives a portion of the locator assembly and the slot is sized to allow the portion of the locator assembly to slide in the slot while the metallic support carrier thermally expands and contracts during use of the vane assembly in the gas turbine engine.

3. The vane assembly of claim 2, wherein the locator assembly includes a locator flange that engages the vane mount of the vane opposite the load-transfer pads to prevent the vane from rotating relative to the support assembly and a pin that extends through the locator flange and the second portion of the mount flange to couple the locator flange to the metallic support carrier, and the pin is the portion of the locating assembly in the slot of the metallic support carrier.

4. The vane assembly of claim 3, wherein the locator flange comprises ceramic matrix composite materials.

5. The vane assembly of claim 4, wherein the locator flange includes a base and an arm that extends radially inward from the base and engages the vane mount of the vane.

6. The vane assembly of claim 5, wherein the arm of the locator flange is fixed to the vane mount of the vane to block relative movement between the vane and the locator flange.

7. The vane assembly of claim 5, wherein the arm of the locator flange is shaped to define a key feature that mates with a corresponding key seat formed in the vane mount of the vane to block relative movement between the vane and the locator flange.

8. The vane assembly of claim 1, wherein the vane mount has a leading edge, a trailing edge, a pressure side, and a suction side, the load-transfer pads are located between the suction side of the vane mount and the first portion of the mounting flange, and the locator assembly is located on the pressure side of the vane mount.

9. The vane assembly of claim 8, wherein the load-transfer pads includes a first load-transfer pad and a second load-transfer pad spaced apart from the first load-transfer pad along the suction side of the vane mount, and wherein the first and second load-transfer pads are located on either side of a resultant aerodynamic load vector from aerodynamic force loads experienced by the vane during use of the vane assembly in the gas turbine engine.

* * * * *